(12) United States Patent
Huang et al.

(10) Patent No.: US 12,503,586 B2
(45) Date of Patent: Dec. 23, 2025

(54) THERMAL CONDUCTIVE POTTING COMPOSITION

(71) Applicant: Henkel AG & Co. KGaA, Duesseldorf (DE)

(72) Inventors: Lei Huang, Shanghai (CN); Hao Wu, Shanghai (CN); Xueyu Qiu, Shanghai (CN); Xuan Xie, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 732 days.

(21) Appl. No.: 17/239,789

(22) Filed: Apr. 26, 2021

(65) Prior Publication Data

US 2021/0238408 A1  Aug. 5, 2021

Related U.S. Application Data

(63) Continuation of application No. PCT/CN2018/112319, filed on Oct. 29, 2018.

(51) Int. Cl.
*C09K 5/14* (2006.01)
*C08L 63/00* (2006.01)

(52) U.S. Cl.
CPC ............ *C08L 63/00* (2013.01); *C09K 5/14* (2013.01); *C08L 2205/025* (2013.01)

(58) Field of Classification Search
CPC .... C09K 5/14; C08K 3/22; C08K 2003/2227; C08K 9/06; C08K 2201/001; C08K 2201/005; C08L 63/00; C08L 2205/02; C08L 2205/025; C09D 163/00
See application file for complete search history.

(56) References Cited

U.S. PATENT DOCUMENTS

| | | | | | |
|---|---|---|---|---|---|
| 4,419,496 | A | * | 12/1983 | Henton | C08C 1/07 525/902 |
| 4,871,806 | A | * | 10/1989 | Shalati | C08G 59/4284 525/445 |
| 6,410,127 | B1 | * | 6/2002 | Kamae | C08G 59/18 528/421 |
| 6,613,437 | B1 | * | 9/2003 | Eckhardt | A61K 6/30 523/455 |
| 9,074,108 | B2 | * | 7/2015 | Huber | H01F 41/127 |
| 9,196,412 | B2 | * | 11/2015 | Esseghir | H01B 3/40 |
| 9,375,785 | B2 | | 6/2016 | Prabhu et al. | |
| 2002/0105093 | A1 | * | 8/2002 | Papathomas | H01L 23/295 257/E21.503 |
| 2002/0185303 | A1 | | 12/2002 | Takeuchi et al. | |
| 2005/0129955 | A1 | | 6/2005 | Schoenfeld et al. | |
| 2008/0039555 | A1 | * | 2/2008 | Ruyters | H01L 23/295 257/E23.107 |
| 2009/0023056 | A1 | * | 1/2009 | Adams | B60L 58/25 29/890.035 |
| 2013/0181361 | A1 | * | 7/2013 | Uehara | H01L 23/296 257/788 |
| 2015/0299550 | A1 | * | 10/2015 | Kusunoki | C08K 3/22 252/75 |
| 2016/0122604 | A1 | * | 5/2016 | Yoshimoto | C08G 59/32 252/74 |
| 2017/0158807 | A1 | * | 6/2017 | Yoshimoto | C08K 9/08 |
| 2017/0345735 | A1 | * | 11/2017 | Yang | H01L 25/117 |
| 2020/0154608 | A1 | | 5/2020 | Kim et al. | |

FOREIGN PATENT DOCUMENTS

| | | | | |
|---|---|---|---|---|
| CA | 2365510 | A1 * | 9/2000 | |
| CN | 106519581 | A | 3/2017 | |
| CN | 106753143 | A | 5/2017 | |
| EP | 590975 | A1 * | 4/1994 | ........... C08G 59/145 |
| EP | 1887033 | A1 | 2/2008 | |
| JP | 2000239489 | A | 9/2000 | |
| JP | 2002158450 | A | 5/2002 | |
| JP | 2006045343 | A | 2/2006 | |
| JP | 2010003858 | A * | 1/2010 | ............ H01L 24/41 |
| JP | 2010132838 | A | 6/2010 | |
| JP | 2013100526 | A | 5/2013 | |
| JP | 2014518921 | A | 8/2014 | |
| JP | 2015021118 | A * | 2/2015 | |
| KR | 20170132605 | A | 12/2017 | |
| WO | 2010103852 | A1 | 9/2010 | |
| WO | WO-2014092196 | A1 * | 6/2014 | ............ C08G 77/50 |
| WO | WO-2017220583 | A1 * | 12/2017 | ............ C08G 18/10 |
| WO | WO-2018024865 | A1 * | 2/2018 | ............ C08G 77/08 |
| WO | WO-2019070819 | A1 * | 4/2019 | ............ C08G 59/44 |
| WO | 2020087196 | A1 | 5/2020 | |

OTHER PUBLICATIONS

Epoxy Resin Systems Fact Sheet (California Department of Health Services) (Year: 1989).*
EponTM Resin 862 Technical Data Sheet (Year: 2005).*
D.E.R.TM 331 Epoxy Resin SDS (Year: 2006).*
D.E.R.TM 331TM Liquid Epoxy Resin Product Information (Year: 2017).*

* cited by examiner

*Primary Examiner* — Matthew R Diaz
(74) *Attorney, Agent, or Firm* — Steven C. Bauman

(57) ABSTRACT

This invention relates to a thermal conductive potting composition. In particular, the present invention relates to a thermal conductive potting composition having a low viscosity, a high thermal conductivity, a high toughness and excellent thermal shock performance for new energy vehicles.

6 Claims, 1 Drawing Sheet

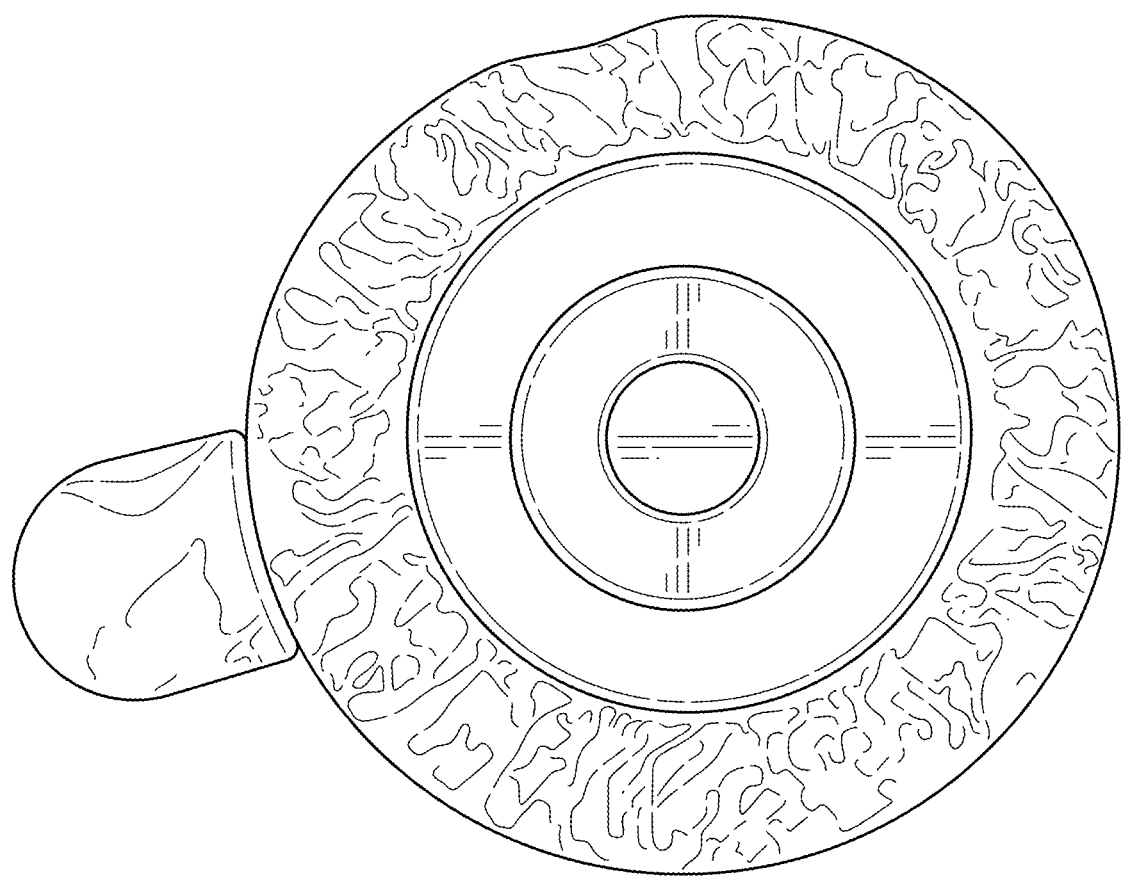

THERMAL CONDUCTIVE POTTING COMPOSITION

TECHNICAL FIELD

This invention relates to a thermal conductive potting composition. In particular, the present invention relates to a thermal conductive potting composition having a low viscosity, a high thermal conductivity, a high toughness (i.e., excellent bond strength) and excellent thermal shock performance for new energy vehicles.

BACKGROUND OF THE INVENTION

In order to reduce oil dependence, air pollution and carbon emissions, recently new energy vehicles (NEVs), which are vehicles that are partially or fully powered by electricity, such as battery electric vehicles (BEVs) and plug-in hybrids (PHEVs), develops very fast in the world, especially in China. For example, the cumulative sales of new energy vehicles in China were merely 8,159 in 2011 and increased to 1,728,447 in 2017.

With the development of new energy vehicle industry, high horsepower will require high power density from their electrical components such as batteries, motors and generators. The smaller, lighter and less expensive components will be more and more popular in future. It not only saves the space, but it reduces costs while improving working efficiency. The tradition impregnation processing could not satisfy new heat conductive request. Providing thermal conductive potting compounds is an ideal method for effectively conducting heat away from the power components to the heat sink.

In the new energy vehicles, complete coil assembly is usually encapsulated in a casting resin, for example, based on epoxy resin. All spaces between conductors are impregnated without cavities or bubbles. The casting resin, which may be a potting compound, has a broad range of properties. These include, for example, a low viscosity during processing, so that all spaces between the conductors are completed impregnated (e.g., free from cavities or bubbles), and a high modulus of elasticity in order to provide a high overall rigidity and thus more accurate positioning of the individual windings. The casting resin may have good thermal conductivity to provide effective transfer of heat from conductor structures to cooling layer. The casting resin may have a high heat resistance that is reflected in a high glass transition temperature so that as constant a property profile as possible may be achieved in the operating temperature range. The casting resin may have a low coefficient of thermal expansion (e.g., if possible, similar to the coefficient of thermal expansion of the other materials used (copper conductors, insulation layers)) in order to prevent mechanical stress and thereby a simplified crack formation, which may lead to cracks and peeling in coil unit when heated both during operation and during the cooling from curing temperature. In this context, a high crack resistance should also be mentioned. A high partial discharge resistance, a low dielectric loss factor, flame retardance, and economic aspects should also be mentioned.

Epoxy-based casting resin may be used as potting compound. For example, U.S. Pat. No. 9,074,108 B2 discloses a potting compound suitable for potting an electronic component, in particular a large-volume coil such as a gradient coil, consisting of a supporting matrix in which at least one filler made of polymer nanoparticles is distributed. Although this potting composition has a good flame retardance and a low viscosity, it could not satisfy the requirements of the new energy vehicles heat management, and it cannot satisfy the requirements of bonding and those of thermal shock resistance at the same time for new energy vehicles.

There is a need for a thermal conductive potting composition that has a low viscosity, a high thermal conductivity, a high toughness and excellent thermal shock performance.

SUMMARY OF THE INVENTION

It is an object of the present invention to provide a thermal conductive potting composition having a low viscosity, a high thermal conductivity, a high toughness and excellent thermal shock performance.

The present invention provides a thermal conductive potting composition, comprising
A) an epoxy resin having a viscosity of at least 500 mPa·s at 25° C.,
B) a modified epoxy resin with at least three epoxy functional groups, having a viscosity at least 10 mPa·s and not greater than 1000 mPa·s at 25° C.,
C) core shell nanoparticles, 20% by weight of which have a particle size of 0.01 to 1 µm,
D) fillers, which comprises:
  D1) a silane surface-modified spherical alumina, which has an average particle size of greater than 15 µm and not greater than 100 µm, and
  D2) a thermal conductive powder having an average particle size of greater than 0.01 µm and not greater than 15 µm, and
E) a curing agent.

The present invention also provides a two-component thermal conductive potting composition, wherein part A comprises:
A) an epoxy resin having a viscosity of at least 500 mPa·s at 25° C.,
B) a modified epoxy resin with at least three epoxy functional groups, having a viscosity at least 10 mPa·s and not greater than 1000 mPa·s at 25° C.,
C) core shell nanoparticles, 20% by weight of which have a particle size of 0.01 to 1 µm,
D) fillers, which comprises:
  D1) a silane surface-modified spherical alumina, which has an average particle size of greater than 15 µm and not greater than 100 µm, and
  D2) a thermal conductive powder having an average particle size of greater than 0.01 µm and not greater than 15 µm; and
part B comprises:
E) a curing agent.

The present invention further provides the use of the thermal conductive potting composition according to the present invention or the two-component thermal conductive potting composition according to the present invention for new energy vehicles.

The present invention furthermore provides a new energy vehicle comprising a cured product of the thermal conductive potting composition according to the present invention or the two-component thermal conductive potting composition according to the present invention.

The thermal conductive potting composition according to the present invention has a low viscosity, a high thermal conductivity, a high toughness (i.e. excellent bond strength) and excellent thermal shock performance for new energy vehicles.

BRIEF DESCRIPTION OF THE DRAWINGS

FIG. 1 shows a picture of the device for measuring the thermal shock resistance of the compositions of Examples 1 to 5 and Comparative Examples 1 to 6.

DETAILED DESCRIPTION OF THE INVENTION

In the following passages, the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

According to the present invention, the thermal conductive potting composition comprises
  A) an epoxy resin having a viscosity of at least 500 mPa·s at 25° C.,
  B) a modified epoxy resin with at least three epoxy functional groups, having a viscosity at least 10 mPa·s and not greater than 1000 mPa·s at 25° C.,
  C) core shell nanoparticles, 20% by weight of which have a particle size of 0.01 to 1 µm,
  D) fillers, which comprises:
    D1) a silane surface-modified spherical alumina, which has an average particle size of greater than 15 µm and not greater than 100 µm, and
    D2) a thermal conductive powder having an average particle size of greater than 0.01 µm and not greater than 15 µm, and
  E) a curing agent.

A) Epoxy Resin

According to the present invention, the epoxy resin has a viscosity of at least 500 mPa·s at 25° C., preferably at least 1000 mPa·s at 25° C., more preferably at least 5000 mPa·s at 25° C., particularly preferably at least 10000 mPa·s at 25° C. Herein, all the viscosity values are tested using a Brookfield Viscometer, unless otherwise specified.

Preferably, the epoxy resin may be selected from the group consisting of bisphenol-A epoxy resin, bisphenol-F epoxy resin, cycloaliphatic epoxy resin, and phenolic epoxy resin. More preferably, the epoxy resin may be a bisphenol-A epoxy resin.

Suitable epoxy resin for the present invention includes, for example, NPEL-127, NPEL-127E, NPEL-127H, NPEL-128, NPEL-128E, NPEL-128G, NPEL-128R, NPEL-128S, NPEF-170, NPEF-180, NPEF-185, NPEF-187, NPEF-198, NPPN-630L, NPPN-630, and NPPN-631, all of which are commercially available from NAN YA EPOXY RESIN; 850, which is commercially available from Blue Star New Chemical Materials Co., Ltd.; CYD 128, which is commercially available from Baling Petrochemical Corporation; YD 128, which is commercially available from NIPPON STEEL Chemical & Material; EP4100, which is commercially available from ADEKA Corporation; R140, which is commercially available from Mitsui Chemicals; D.E.R. 331, which is commercially available from Dow Chemical Company; NPEL128, which is commercially available from Nanya Epoxy Resin; and YD128, which is commercially available from Kukdo Chemical Co., Ltd. Preferably, a commercially available example of the epoxy resin is NPEL-128.

The epoxy resin is present in an amount of 1% to 40% by weight, and preferably 5% to 25% by weight, based on the total weight of the thermal conductive potting composition. If the content of the epoxy resin is less than 1%, the thermal conductive potting composition would not exhibit a good bond strength and a good thermal shock resistance. If the content of the epoxy resin is more than 40%, the viscosity of the thermal conductive potting composition would be too high and a thermal conductive filler could not be added to the composition, and thus, the composition could not exhibit a low viscosity and a high thermal conductivity.

B) Modified Epoxy Resin with at Least Three Epoxy Functional Groups

According to the present invention, the modified epoxy resin with at least three epoxy functional groups has a viscosity of at least 10 mPa·s and not greater than 1000 mPa·s at 25° C., preferably a viscosity of 50 to 800 mPa·s at 25° C., preferably a viscosity of 100 to 600 mPa·s at 25° C.

In a preferable embodiment, the modified epoxy resin contains three epoxy functional groups.

In the thermal conductive potting composition according to the present invention, the modified epoxy resin with at least three epoxy functional groups serves as an epoxy reactive diluent, which not only decreases the viscosity of the composition but also participates in a curing reaction. Preferably, the modified epoxy resin can be selected from a group consisting of triglycidyl ethers. More preferably, the modified epoxy resin is trimethylol propane triglycidyl ether.

Suitable modified epoxy resin for the present invention includes, for example, Heloxy™ Modifier 48, Heloxy™ Modifier 84 and Heloxy™ Modifier 505, all of which are commercially available from Hexion Specialty Chemicals, Inc; and Epodil® 733 and Epodil® 762, both of which are commercially available from Evonik Industries AG. Preferably, a commercially available example of the modified epoxy resin is Heloxy™ Modifier 48.

The modified epoxy resin is present in an amount of 0.1% to 20% by weight, preferably 0.5% to 10% by weight, and more preferably 1.5% to 5% by weight, based on the total weight of the thermal conductive potting composition. If the content of the modified epoxy resin is less than 0.1%, the viscosity of the thermal conductive potting composition would not be decreased. If the content of the modified epoxy resin is more than 20%, physical properties of the thermal conductive potting composition would be poor, and the cured product of the potting composition would be very brittle.

C) Core Shell Nanoparticles

According to the present invention, 20% by weight of the core shell nanoparticles have a particle size of 0.01 to 1 μm, preferably a particle size of 0.1 to 0.8 μm, more preferably a particle size of 0.3 to 0.7 μm.

In the thermal conductive potting composition according to the present invention, the core shell nanoparticles serve as a toughening agent. Suitable core shell nanoparticles for the present invention can be any core shell nanoparticles so long as they can be used for the purpose of the present invention. Preferably, they can be selected from a group consisting of reactive liquid rubber, such as carboxyl-terminated butadiene acrylonitrile (CTBN) liquid rubber, amine-terminated butadiene acrylonitrile (ATBN) liquid rubber, and vinyl-terminated butadiene acrylonitrile (VTBN) liquid rubber; preformed particles, such as thermoplastic powders or core-shell polymers made from elastomeric latexes; and Interpenetrating Polymer Network (IPN) tougheners having core-shell structures.

Suitable modified epoxy resin for the present invention includes, for example, Hypox™ RA840, which is commercially available from CVC Thermoset Specialties; and Kane Ace™ MX267, Kane Ace™ MX120, Kane Ace™ MX125, Kane Ace™ MX153, Kane Ace™ MX154, Kane Ace™ MX156, Kane Ace™ MX257, Kane Ace™ MX960, Kane Ace™ MX170, Kane Ace™ MX135, Kane Ace™ MX136, Kane Ace™ MX416, Kane Ace™ MX451, Kane Ace™ MX217 and Kane Ace™ MX717, all of which are commercially available from Kaneka Corporation.

The core shell nanoparticles are present in an amount of 1% to 50% by weight, and preferably 2% to 20% by weight, based on the total weight of the thermal conductive potting composition. If the content of the core shell nanoparticles is less than 1%, the toughness of the thermal conductive potting composition could not be improved, and the potting composition would be very hard and would not exhibit a thermal shock resistance. If the content of the core shell nanoparticles is more than 50%, the viscosity of the thermal conductive potting composition would be too high, and the heat resistance thereof would be poor.

D) Fillers

D1) a Silane Surface-Modified Spherical Alumina, which has an Average Particle Size of Greater than 15 μm and not Greater than 100 μm According to the present invention, the silane surface-modified spherical alumina has an average particle size of greater than 15 μm and not greater than 100 μm, preferably an average particle size of greater than 15 μm and not greater than 70 μm, and more preferably an average particle size of greater than 17 μm and not greater than 35 μm.

According to the present invention, the silane surface-modified spherical alumina can be modified with different types of multifunctional silane. Suitable silane surface-modified spherical alumina for the present invention includes Hypox™ RA840, which is commercially available from CVC Thermoset Specialties; Kane Ace™ MX267, which is commercially available from Kaneka Corporation; and dynasylan 1146 and 9496, both of which are commercially available from Evonik Industries AG. Preferably, they are selected from the group consisting of Hypox™ RA840 and Kane Ace™ MX267.

Preferably, the component D1) contains 0.001 to 5% by weight of silane.

The component D1) is present in an amount of 30% to 80% by weight, preferably 42% to 75% by weight, and more preferably 45% to 68% by weight, based on the total weight of the thermal conductive potting composition.

D2) a Thermal Conductive Powder Having an Average Particle Size of Greater than 0.01 μm and not Greater than 15 μm According to the present invention, the thermal conductive powder has an average particle size of greater than 0.01 μm and not greater than 15 μm, preferably an average particle size of greater than 2 μm and not greater than 10 μm, and more preferably an average particle size of greater than 3 μm and not greater than 5 μm.

Suitable thermal conductive powder for the present invention can be any thermal conductive powder having an average particle size of greater than 0.01 μm and not greater than 15 μm, as long as it can be used for the purpose of the present invention. For example, the thermal conductive powder according to the present invention can be $Al_2O_3$, MgO, $SiO_2$, $Al(OH)_3$, $Mg(OH)_2$, BN, AlN, SiC, SiN, or any combinations thereof. Preferably, the thermal conductive powder according to the present invention is spherical alumina powder. For example, examples of the thermal conductive powder include BAK-2, BAK-5 and BAK-10, all of which are commercially available from Bestry Performance Materials Corporation.

The thermal conductive powder is present in an amount of 5% to 80% by weight, preferably 8% to 50% by weight, and more preferably 10% to 25% by weight, based on the total weight of the thermal conductive potting composition. If the content of the thermal conductive powder is less than 5%, the thermal conductivity of the thermal conductive potting composition would be too low, in which case the thermal conductive powder cannot effectively disperse the heat of device. If the content of the thermal conductive powder is more than 80%, the viscosity of the thermal conductive potting composition would be too high, which is not advantageous for processing of the potting composition.

E) Curing Agent

According to the present invention, the curing agent can be any curing agent as long as they can be used for the purpose of the present invention. Suitable curing agents for the present invention include anhydride and amine hardener). Preferably, the curing agent can be selected from low viscosity anhydride and amine hardener. More preferably, the curing agent can be selected from a group consisting of methylhexahydrophthalic anhydride and polyetheramine. For example, examples of the curing agent include MHHPA, which is commercially available from Shangdong QING YANG Corporation; and D230, which is commercially available from Huntsman Corporation.

The curing agent is present in an amount of 1% to 20% by weight, and preferably 5% to 15% by weight, based on the total weight of the thermal conductive potting composition. If the content of the curing agent is less than 1%, or more than 20%, the thermal conductive potting composition could not be cured.

The thermal conductive potting composition according to the present invention may contain a variety of other additives as necessary. The optional additives in the potting composition include, for example, one or more of types of cure accelerators, adhesion promoters, thixotropes, other adjuvants; or combinations thereof to provide each of components A) to E) and/or the mixtures of any two or more of components A) to E) with desirable physical and chemical properties and to provide cured reaction product of the potting composition obtained therefrom with desirable physical and chemical properties. Naturally, the additives should not adversely impact properties of the cured reaction products allowing their use in the application.

Cure Accelerator

Cure accelerators are materials that materially shorten the gel time and/or increase completion of cure. Various compounds, such as tertiary amines, imides, polyamines, cyclicamines and arylamines also can be included in the thermal conductive potting composition according to the present invention. Also included as potential accelerators, but not limited to these, are the following classes: strong acids, organic and inorganic acids, fluoro acids, fluoro-sulphonic acids, fluoro acetic acids, water, alcohols, phenols, fluorophenols, salicylic acid, amine, calcium, and metal salts of any or all the acids above, polyols, active hydrogen materials and their salts and/or complexes and the like. For example, suitable cure accelerators for the present invention include DMP-30, which is commercially available from Huntsman Corporation.

The useful amounts of cure accelerator typically range from 0% to 30% by weight of the total composition. Desirably, a cure accelerator is present in an amount of 0.001% to 10% by weight of the total composition.

Adhesion Promoter

The thermal conductive potting composition according to the present invention can comprise one or more products to help improve adhesion of reaction products of the potting composition to a substrate surface. Useful adhesion promoter materials include reaction products of epoxy resins and compounds containing chelating functional groups (herein called "chelate-modified epoxy resins") and functional silanes.

Such reaction products include those substances commonly referred to as "chelate epoxies" or "chelating epoxy resins". The chelating functional groups include those functional groups capable of forming chelate bonds with divalent or polyvalent metal atoms, either by themselves or in cooperation with other functional groups positioned on the same molecule. Suitable chelating functional groups include, for example, phosphorus-containing acid groups (e.g., —PO(OH)$_2$), carboxylic acid groups (—CO$_2$H), sulfur-containing acid groups (e.g., —SO$_3$H), amino groups, and hydroxyl groups (particularly hydroxyl groups adjacent to each other on aromatic rings). The preparation of such reaction products may be caried out by methods known in the art such as, for example, those methods described in U.S. Pat. Nos. 4,702,962 and 4,340,716, European Patent No. EP 342 035 and Japanese Patent Document Nos. JP 58-063758 and JP 58-069265, each of which is incorporated herein by reference in its entirety. Reaction products of epoxy resins and compounds containing chelating functional groups are also available from commercial sources such as, for example, the ADEKA Resins EP-49-10N, EP-49-55C, EP-49-10, EP-49-20, EP-49-23, and EP-49-25 sold by Asahi Denka.

Other compounds having metal chelating properties may also be used to help enhance the adhesion of the cured product of the potting composition to a substrate surface, including, for example, the adhesion promoter described in U.S. Patent Application Publication No. U.S. 2005/0129955, incorporated herein by reference in its entirety. Also suitable for use as adhesion promoters are the acetoacetate-functionalized modifying resins sold by King Industries under the brand name K-FLEX XM-B301.

Some functional silanes include a reactive component that can bond or interact with the composition, a silane component that can react with substrates and/or other silane modified materials and a hydrolysable component. Some functional silanes having an epoxy reactive component are sold by Momentive Performance Materials Inc. of Connecticut.

The thermal conductive potting composition according to the present invention may contain, for example, up to 6% by weight of adhesion promoter. The adhesion promoter can be formulated into any one, two or more of components A) to E) as desirable.

Thixotrope

Any suitable thixotrope can be included in the thermal conductive potting composition according to the present invention. Suitable thixotropic agents include, for example, Disparlon 6100, Disparlon 6200 (King Industries, Science Rd., Norwalk, Conn.), organo clay, fumed silica, inert and/or functional fillers, plastic fillers, and polyamide powder. Useful amounts of thixotropes typically range from 0% to 30% by weight of the total composition. Desirably, a thixotrope is present in an amount from 1% to 10% by weight of the total composition.

Adjuvants

The thermal conductive potting composition according to the present invention can optionally comprise other common adjuvants, such as flow auxiliaries, coupling agents (e.g., silanes), tackifiers, flame retardants, rheology control agents, inhibitors, corrosion inhibitors, antioxidants, stabilizers, thickeners, plasticizers, elastomers, thermoplastics, coloring agents, shelf-life extenders (for example, zinc chloride), industrial microbiostats, surfactants or wetting agents (for example, Zonyl® FSO, which is sold by DuPont), polymerization inhibitors, and other well-known additives, and combinations thereof to further modify physical and chemical properties of the potting composition and/or cured reaction products obtained from the potting composition.

Depending on desired properties the relative proportions of the individual components may vary within comparatively wide limits. The adjuvants can be formulated into any one, two or more of all the components as desirable.

The thermal conductive potting composition according to the present invention may be manufactured by mixing components A) to E), as well as other additives as necessary, using commonly known methods of manufacture of thermal conductive potting compositions. For example, manufacturing may be by blending the aforementioned components in the prescribed quantities. The order of addition of each component is not specifically limited so long as a thermal conductive potting composition according to the purpose is obtained.

In the thermal conductive potting composition according to the present invention, components A) to D), and component E) can be stored separately. All the above-mentioned components can be homogeneously mixed to form the potting composition shortly before use. In a preferred embodiment, the mixture is degassed by using vacuum, since it will take the bubble by mixing the components. The mixed composition can be applied at room temperature or at an elevated temperature, preferably at 60° C. In another preferred embodiment, the product obtained therefrom is used at 60° C. for potting with vacuum within 20 minutes to 60 minutes.

In a preferred embodiment, the thermal conductive potting composition according to the present invention comprises:

A) 1% to 40% by weight of an epoxy resin having a viscosity of at least 500 mPa·s at 25° C., B) 0.1% to 20% by weight of a modified epoxy resin with at least three epoxy functional groups, having a viscosity of at least 10 mPa·s and not greater than 1000 mPa·s at 25° C., C) 1% to 50% by weight of core shell nanoparticles, 20% by weight of which have a particle size of 0.01 to 1 μm, D) fillers, which comprises:
   D1) 30% to 80% by weight of a silane surface-modified spherical alumina, which has an average particle size of greater than 15 μm and not greater than 100 μm, and
   D2) 5% to 80% by weight of a thermal conductive powder having an average particle size of greater than 0.01 μm and not greater than 15 μm, E) 1% to 20% by weight of a curing agent, wherein the weight ratios of the components are based on the total weight of the thermal conductive potting composition.

The present invention also provides a two-component thermal conductive potting composition, wherein part A comprises:

A) an epoxy resin having a viscosity of at least 500 mPa·s at 25° C.

B) a modified epoxy resin with at least three epoxy functional groups, having a viscosity of at least 10 mPa·s and not greater than 1000 mPa·s at 25° C.

C) core shell nanoparticles, 20% by weight of which have a particle size of 0.01 to 1 μm, D) fillers, which comprises:
   D1) a silane surface-modified spherical alumina, which has an average particle size of greater than 15 μm and not greater than 100 μm, and
   D2) a thermal conductive powder having an average particle size of greater than 0.01 μm and not greater than 15 μm; and part B comprises:

E) a curing agent.

The above-mentioned additive(s), if present, can be present in either or both of parts A and B.

Part A and part B are stored separately. The two parts and the above-mentioned additive(s), if present, can be homogeneously mixed to form the thermal conductive potting composition according to the present invention shortly before use. In a preferred embodiment, the mixture is degassed by using vacuum, since it will take the bubble by mixing parts A and B. The mixed composition can be applied at room temperature or at an elevated temperature, preferably at 60° C. In another preferred embodiment, the product obtained therefrom is used at 60° C. for potting with vacuum within 20 minutes to 60 minutes.

In one embodiment, part A and part B can each be components of a two-part potting package. Each part can be chemically separated and packaged as convenient for use.

The thermal conductive potting composition according to the present invention can be used in the application for new energy vehicle, including battery electric vehicles (BEVs) and plug-in hybrid electric vehicles (PHEVs), industrial equipment, aerospace, and consumer electronics.

Accordingly, the present invention provides a use of the thermal conductive potting composition according to the present invention or the two-component thermal conductive potting composition according to the present invention for new energy vehicles, industrial equipment, aerospace and consumer electronics. Moreover, the present invention also provides a new energy vehicle comprising a cured product of the thermal conductive potting composition according to the present invention or the two-component thermal conductive potting composition according to the present invention.

The thermal conductive potting composition according to the present invention has a low viscosity, a high thermal conductivity, a high toughness (i.e., excellent bond strength) and excellent thermal shock performance for new energy vehicles.

The following examples are intended to assist one skilled in the art to better understand and practice the present invention. The scope of the invention is not limited by the examples but is defined in the appended claims. All parts and percentages are based on weight unless otherwise stated.

EXAMPLES

The following materials were used in the examples.

NPEL 128 is a liquid bisphenol A epoxy resin, having a viscosity of 12000 to 15000 mPa·s at 25° C., commercially available from NAN YA EPOXY RESIN.

HELOXY™ Modifier 48 is trimethyol propane triglycidyl ether, a modified epoxy resin with three epoxy functional groups, having a viscosity of 125 to 250 mPa·s at 25° C., commercially available from Hexion Specialty Chemicals, Inc.

HELOXY™ Modifier 8 is a modified epoxy resin with one epoxy functional group, having a viscosity of 6 to 9 mPa·s at 25° C., commercially available from Hexion Specialty Chemicals, Inc.

ED523T is a modified epoxy resin with two epoxy functional groups, having a viscosity of 18 mPa·s at 25° C., commercially available from ADEKA Corporation.

AEROSIL® R974 is a fumed silica having a BET surface area of 170±20 $m^2$/g and a PH of 3.7 to 4.7, commercially available from Evonik Industries AG.

Hypox™ RA840 is an acrylonitrile containing liquid elastomer modified bisphenol A epoxy resin, core shell nanoparticles, 20% by weight of which have a particle size of 0.01 to 1 μm, having a viscosity of 150,000 to 230,000 mPa·s at 52° C., commercially available from CVC Thermoset Specialties.

Kane Ace™ MX267 are core shell rubber nanoparticles, 20% by weight of which have a particle size of 0.01 to 1 μm, having a viscosity of 7000 mPa·s at 50° C., commercially available from Kaneka Corporation.

Fortegra 202 is a toughening agent having a viscosity of 4500 to 10000 mPa·s at 25° C. measured according to ISO 3219, commercially available from Dow Chemical Company.

QS-N12 is a light-yellow transparent liquid toughening agent, having a viscosity <4000 mPa·s at 25° C., commercially available from BEIJING JIN DAO QI SHI MATERIAL TECHNOLOGY CO., LTD.

QS-VA-3 is a yellow to light brown transparent liquid toughening agent having a viscosity <8000 mPa·s at 25° C., commercially available from BEIJING JIN DAO QI SHI MATERIAL TECHNOLOGY CO., LTD.

BAK-20 is a silane surface-modified spherical alumina, which has an average particle size of 20±2.0 μm, commercially available from Yaan Bestry Performance Materials Corporation.

SJR-20 is crystalline quartz having an average particle size of 20 μm, commercially available from AnHul Estone Materials Technology Co., Ltd.

BAH-20H4 is spherical alumina powder having an average particle size of 20 μm, commercially available from Yaan Bestry Performance Materials Corporation.

BAH-40 is spherical alumina powder having an average particle size of 40 μm, commercially available from Yaan Bestry Performance Materials Corporation BAK-5 is spherical alumina powder having an average particle size of 5.0±1.0 μm, commercially available from Yaan Bestry Performance Materials Corporation.

DMP-30 is tris(dimethylaminomethyl)phenol, commercially available from Huntsman Corporation.

MHHPA is methylhexahydrophthalic anhydride, commercially available from Shangdong QING YANG Corporation.

D230 is a polyetheramine, commercially available from Huntsman Corporation.

Example 1 (Ex 1)

3.2 g of NPEL 128, 0.8 g of HELOXY™ Modifier 48 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

Example 2 (Ex 2)

3.2 g of NPEL 128, 0.8 g of HELOXY™ Modifier 48 and 2 g of Kane Ace™ MX267 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.74 g of MHHPA were added into the mixture, and mixed. After that, the composition thus obtained was put into a haven for curing.

Example 3 (Ex 3)

3.2 g of NPEL 128, 0.8 g of HELOXY™ Modifier 48 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAH-20H4 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

Example 4 (Ex 4)

3.2 g of NPEL 128, 0.8 g of HELOXY™ Modifier 48 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.54 g of D230 were added into the mixture, and mixed. After that, the composition thus obtained was put into a haven for curing.

Example 5 (Ex 5)

3.2 g of NPEL 128, 0.8 g of HELOXY™ Modifier 48 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAH-40 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

The components of Examples 1 to 5 and their amounts are shown in Table 1, respectively.

TABLE 1

Component of inventive examples

| Components | | EX1 | EX2 | EX3 | EX4 | EX5 |
|---|---|---|---|---|---|---|
| Resin | NPEL 128 | 3.2 g | 3.2 g | 3.2 g | 3.2 g | 3.2 g |
| Diluent | HELOXY ™ Modifier 48 | 0.8 g | 0.8 g | 0.8 g | 0.8 g | 0.8 g |
| | HELOXY ™ Modifier 8 | | | | | |
| | ED523T | | | | | |
| Silica | AEROSIL ® R974 | 0.1 g | 0.1 g | 0.1 g | 0.1 g | 0.1 g |
| Toughening agent | Hypox ™ RA840 | 2 g | | 2 g | 2 g | 2 g |
| | Kane Ace ™ MX267 | | 2 g | | | |
| | Fortegra 202 | | | | | |
| | QS-N12 | | | | | |
| | QS-VA-3 | | | | | |
| Filler 1 | BAK-20 | 18.4 g | 18.4 g | | | |
| | SJR-20 | | | | | |
| | BAH-20H4 | | | 18.4 g | 18.4 g | |
| | BAH-40 | | | | | 18.4 g |
| Filler 2 | BAK-5 | 4.6 g | 4.6 g | 4.6 g | 4.6 g | 4.6 g |
| Cure accelerator | DMP-30 | 0.1 g | 0.1 g | 0.1 g | 0.1 g | 0.1 g |
| Curing agent | MHHPA | 3.54 g | 3.74 g | 3.54 g | 3.54 g | 3.54 g |
| | D230 | | | | | |

Comparative Example 1 (CE 1)

3.2 g of NPEL 128, 0.8 g of HELOXY™ Modifier 8 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.2 g of MHHPA were added into the mixture, and mixed. After that, the composition thus obtained was put into a haven for curing.

Comparative Example 2 (CE 2)

3.2 g of NPEL 128, 0.8 g of ED523T and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

Comparative Example 3 (CE 3)

3.2 g of NPEL 128, 0.8 g of HELOXY™ Modifier 48 and 2 g of Fortegra 202 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.35 g of MHHPA were added into the mixture, and mixed. After that, the composition thus obtained was put into a haven for curing.

Comparative Example 4 (CE 4)

3.2 g of NPEL 128, 0.8 g of HELOXY™ Modifier 48 and 2 g of Hypox™ RA840 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of SJR-20 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

Comparative Example 5 (CE 5)

3.2 g of NPEL 128, 0.8 g of HELOXY™ Modifier 48 and 2 g of QS-N12 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

Comparative Example 6 (CE 6)

3.2 g of NPEL 128, 0.8 g of HELOXY™ Modifier 48 and 2 g of QS-VA-3 were added into a Speedmixer DC600 and mixed for 2 minutes under 2000 rpm. Then, 4.6 g of BAK-5 and 0.1 g of AEROSIL® R974 were added into the mixer and mixed for 3 minutes under 2000 rpm. Next, 18.4 g of BAK-20 was added into the mixer and mixed for 3 minutes under 2000 rpm. The thus-obtained mixture was mixed for 2 minutes under 2000 rpm under vacuum. Then, 0.1 g of DMP 30 and 3.54 g of MHHPA were added into the mixture, and mixed. After that, the composition thus obtained was put into a haven for curing.

The components of Comparative Examples 1 to 6 and their amounts are shown in Table 2, respectively.

TABLE 2

| | Components of comparative examples | | | | | | |
|---|---|---|---|---|---|---|---|
| | Components | CE1 | CE2 | CE3 | CE4 | CE5 | CE6 |
| Resin | NPEL 128 | 3.2 g | 3.2 g | 3.2 g | 3.2 g | 3.2 g | 3.2 g |
| Diluent | HELOXY ™ Modifier 48 | | | 0.8 g | 0.8 g | 0.8 g | 0.8 g |
| | HELOXY ™ Modifier 8 | 0.8 g | | | | | |
| | ED523T | | 0.8 g | | | | |
| Silica | AEROSIL ® R974 | 0.1 g | 0.1 g | 0.1 g | 0.1 g | 0.1 g | 0.1 g |
| Toughening agent | Hypox ™ RA840 | 2 g | 2 g | | 2 g | | |
| | Kane Ace ™ MX267 | | | | | | |
| | Fortegra 202 | | | 2 g | | | |
| | QS-N12 | | | | | 2 g | |
| | QS-VA-3 | | | | | | 2 g |
| Filler 1 | BAK-20 | 18.4 g | 18.4 g | 18.4 g | | 18.4 g | 18.4 |
| | SJR-20 | | | | 18.4 g | | |
| | BAH-20H4 | | | | | | |
| | BAH-40 | | | | | | |
| Filler 2 | BAK5 | 4.6 g | 4.6 g | 4.6 g | 4.6 g | 4.6 g | 4.6 g |
| Cure accelerator | DMP-30 | 0.1 g | 0.1 g | 0.1 g | 0.1 g | 0.1 g | 0.1 g |
| Curing agent | MHHPA | 3.2 g | 3.54 g | 3.35 g | 3.54 g | 3.54 g | 3.54 g |
| | D230 | | | | | | |

Performance Evaluation
Viscosity:
Viscosity of compositions of Examples 1-5 and Comparative Examples 1-6 was tested using Rheometer MCR 301 at 25° C. and 5 1/s.
Thermal Conductivity:
Thermal conductivity of compositions of Examples 1-5 and Comparative Examples 1-6 was tested using LFA 467, which is commercially available from NETZSCH, according to ASTM E1461 of American Society for Testing and Materials at 25° C.

Lapshear Strength:

Lapshear strength of compositions of Examples 1-5 and Comparative Examples 1-6 was tested using Instron 5569 with Al and Al substrates according to ASTM D1002 of American Society for Testing and Materials at 25° C.

Thermal Shock Resistance:

The test was carried out as follows: as shown in FIG. 1, Aluminum caps, a steel ring and a insulation paper were used to form a device, which simulates a Motor stator; each of the compositions of Examples 1-5 and Comparative Examples 1-6 was potted into the device until the aluminum caps were submerged, and then, they were placed in an oven for curing; and after that, the device with a cured product of the composition was put into a thermal shock machine for shocking at −40 C° C. for 1 hour and at 150 C° C. for 1 hour as a cycle. The shock cycle was continued until the cured product has a crack. The thermal shock resistance of the composition was measured in the cycle number. The cycle number is higher, the thermal shock resistance of the composition is better.

The test results of the performance evaluation on the inventive and comparative thermal conductive potting compositions are shown in Tables 3 and 4, respectively.

TABLE 3

Test results of inventive examples

| Test Items | EX1 | EX2 | EX3 | EX4 | EX5 |
|---|---|---|---|---|---|
| Viscosity @25° C. 5 1/s Pa · s | 66.8 | 18.4 | 67.5 | 40.7 | 111 |
| Thermal conductivity w/m · k | 0.73 | 0.78 | 0.73 | 0.8 | 0.75 |
| Lapshear strength Al/Al Mpa | 6.4 | 12.5 | 10.8 | 10.2 | 4.8 |
| Thermal shock resistance −40° C. 1 h, 150° C. 1 h | 285 cy x | 345 cy x | >380 cy | 270 cy x | >380 cy |

As shown in Table 3, the thermal conductive potting composition of the present invention possesses a low viscosity and exhibited excellent bonding performance and thermal shock resistance at the same time.

TABLE 4

Test results of comparative examples

| Test Items | CE1 | CE2 | CE3 | CE4 | CE5 | CE6 |
|---|---|---|---|---|---|---|
| Viscosity @ 25° C. 5 1/s Pa · s | 35 | 41 | 32.1 | 251 | 14.7 | 31.98 |
| Thermal Conductivity w/m · k | 0.68 | 0.65 | 0.68 | 0.8 | 0.76 | 0.74 |
| Lapshear strength Al/Al Mpa | 5.4 | 6.7 | 3.3 | 4.7 | 1.5 | 4.3 |
| Thermal shock resistance −40° C. 1 h, 150° C. 1 h | 228 cy x | 120 cy x | 80 cy x | 300 cy x | 300 cy x | 228 cy x |

As shown in Table 4, the comparative compositions containing a modified epoxy resin with one epoxy functional group (CE1), or a modified epoxy resin with two epoxy functional groups (CE2) exhibited poor thermal shock resistance; the comparative compositions containing Fortegra 202 (CE3) or QS-VA-3 (CE6) exhibited poor bonding performance and thermal shock resistance; the comparative composition containing QS-N12 (CE5) exhibited poor bonding performance; and the comparative compositions containing SJR-20 (CE4) has a very high viscosity, in which case the potting composition cannot be processed. To sum up, the thermal conductive potting compositions which do not fall within the scope of the invention could not exhibit a low viscosity, and excellent bonding performance and thermal shock resistance at the same time.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A thermal conductive potting composition, consisting of:
   A) a first epoxy resin having a viscosity of at least 10000 mPa·s at 25° C., the epoxy resin being present in an amount of about 10 wt. % based on the total weight of the composition,
   B) a second epoxy resin that is different from the first epoxy resin, the second epoxy resin being a triglycidyl ether resin having at least three epoxy functional groups, and a viscosity of at least 10 mPa·s and not greater than 1000 mPa·s at 25° C.,
   C) core shell nanoparticles, 20% by weight of which have a particle size of 0.01 to 1 μm,
   D) fillers, which consist of:
      D1) a silane surface-modified spherical alumina, which has an average particle size of greater than 17 μm and not greater than 35 μm, the silane surface-modified spherical alumina being present in an amount of about 56 wt. % based on the total weight of the composition and
      D2) a thermal conductive alumina powder having an average particle size of greater than 3 μm and not greater than 5 μm, the thermal conductive powder being present in an amount of about 14 wt. % based on the total weight of the composition,
   E) a curing agent,
   F) a cure accelerator being tris(dimethylaminomethyl) phenol, and
   G) silica.

2. The thermal conductive potting composition according to claim 1, wherein the content of the component B) is from 1.5% to 5% by weight, based on the total weight of the composition.

3. The thermal conductive potting composition according to claim 1, wherein the content of the component C) is from 1% to 50% by weight, based on the total weight of the composition.

4. The thermal conductive potting composition according to claim 1, wherein the component D1) contains 0.001% to 5% by weight of silane.

5. The thermal conductive potting composition according to claim 1, wherein the content of the component E) is from 1% to 20% by weight, based on the total weight of the composition.

6. A new energy vehicle comprising a cured product of the thermal conductive potting composition according to claim 1.

* * * * *